US005640693A

United States Patent [19]

Balch et al.

[11] Patent Number: 5,640,693

[45] Date of Patent: Jun. 17, 1997

[54] TRANSMITTER FOR PULSED ELECTRONIC ARTICLE SURVEILLANCE SYSTEMS

[75] Inventors: Brent Balch, Fort Lauderdale; Steve Embling, Pompano Beach, both of Fla.; Dave Roberson, Forest, Va.

[73] Assignee: Sensormatic Electronics Corporation, Deerfield Beach, Fla.

[21] Appl. No.: 297,809

[22] Filed: Aug. 30, 1994

[51] Int. Cl.[6] .......... H04B 1/04

[52] U.S. Cl. .......... 455/127; 330/127; 340/572

[58] Field of Search .......... 455/127, 41; 330/127, 330/51; 340/572

[56] References Cited

U.S. PATENT DOCUMENTS 3,714,653 1/1973 Thor et al. .......... 342/201
4,268,797 5/1981 Buck et al. .......... 330/277
5,239,696 8/1993 Balch et al. .......... 455/127

*Primary Examiner*—Thomas Mullen
*Attorney, Agent, or Firm*—Robin, Blecker, Daley & Driscoll

[57] ABSTRACT

An electronic article surveillance (EAS) system includes a pulsed EAS transmitter, a linear power amplifier having active devices for linear amplification of signals input thereto and a controller for energizing the linear power amplifier active devices correspondingly with transmitter pulsations. A transmitter for use in electronic article surveillance, comprises a transmitting antenna, a source providing a succession of mutually spaced bursts of high-frequency signals, a linear power amplifier having active devices for linear amplification of the succession of mutually spaced bursts of high-frequency signals and a controller for selectively energizing the linear power amplifier active devices. The controller maintains the linear power amplifier active devices unenergized between successive of the mutually spaced bursts of high-frequency signals.

7 Claims, 3 Drawing Sheets

TRANSMITTER FOR PULSED ELECTRONIC ARTICLE SURVEILLANCE SYSTEMS

FIELD OF THE INVENTION

This invention relates generally to electronic article surveillance (EAS) and pertains more particularly to improved transmitters for EAS systems.

BACKGROUND OF THE INVENTION

One present commercially implemented EAS system has a transmitter which radiates a pulsed magnetic fluid into a surveillance area wherein it is desired to note the presence of articles bearing EAS tags. When a tagged article is present in the surveillance area, its tag is excited by the radiated magnetic field and, based on its composition, is caused to generate a detectable response signal. A receiver, which is enabled between successively spaced transmitter field radiations, detects the response signal of the tag and initiates an alarm or other activity to indicate the presence of the tag in the surveillance area.

A transmitter suited for use in the described EAS system is shown in commonly-assigned U.S. Pat. No. 5,239,696 (the '696 patent), to which incorporating reference is hereby made.

Referring to FIG. 1 of the '696 patent, power amplifier 8 drives resonant antenna 2A and the antenna is driven to provide a recurrent magnetic field substantially unaffected by inductance changes of the antenna brought about such as by objects passing through or present in the surveillance area. Such invariant field conditions are enabled through sensing resistor 9 and summing amplifier 7, the latter providing input to the power amplifier 8.

One facet of the '696 patent of consequence to the subject invention in one embodiment thereof is the envelope shaping effected in circuit 20. The envelope shaping is depicted in FIG. 4 of the '696 patent, i.e., the envelope has adjusted rise and fall times, respectively shown at Tr and Tf. Accordingly, the signal fed to summing amplifier for combination with the sensing resistor 9 signal has a gradual buildup and a gradual falloff. For the purposes of the '696 patent, the envelope wave shaping serves two purposes, namely, providing desired low harmonic content and rapid shutoff of the signal.

Various countries have very strict electromagnetic interference (EMI) limits requiring particularly clean emissions, which, if not met by EAS systems, preclude such countries as a market therefor. Clean emissions can be attained through the use of linear power amplifiers, such as that of the '696 patent. However, pulsed EAS systems involve the production of a high current burst in an antenna for a short period of time. This necessitates that, where a linear power amplifier is used, it must be designed with a significant extra power margin, since linear power amplifiers are typically only about thirty to forty percent efficient. A significant contributor to this inefficiency is the bias current which must flow in all the active devices in the amplifier in order to keep them operating in the linear region of their conduction curves. This bias current causes heat to be generated in the linear circuits, regardless of whether the system is actually transmitting. The linear power amplifier of the '696 patent has such need for continuous bias current.

Another disadvantage attending use of linear power amplifiers in pulsed EAS systems derives from coupling between transmitting and receiving antennas. Many EAS systems use so-called "transceiver" antennas, wherein the transmitter and receiver coils are in very close proximity. In some instances, the transmitting and receiving functions are effected using the same coil. The linear power amplifier is never deenergized. Rather, it simply does not receive an input signal during periods of no transmission. On the other hand, during such no transmission periods, broad spectrum noise is generated in the various energized stages of the linear power amplifier and passed to the transmitting antenna and coupled to the receiving antenna. The noise contains energy at the EAS system operating frequency, and, although of low signal level, the EAS system receiver typically has enough gain that its sensitivity is reduced by this noise. Again, this disadvantage attends the power amplifier of the '696 patent.

SUMMARY OF THE INVENTION

The present invention has as its primary object effective use of linear power amplifiers in EAS system transmitters.

A more particular object of the invention is to overcome the above-noted disadvantages involved in past usage of linear power amplifiers in EAS systems.

In attaining these and other objects, the invention provides in combination, in a pulsed EAS transmitter, a linear power amplifier having active devices for linear amplification of signals input thereto and control means for energizing the linear power amplifier active devices correspondingly with transmitter pulsations.

The invention provides a transmitter for use in electronic article surveillance, comprising: a transmitting antenna; a source providing a succession of mutually spaced bursts of high-frequency signals; a linear power amplifier having active devices for linear amplification of the succession of mutually spaced bursts of high-frequency signals; and control means for selectively energizing the linear power amplifier active devices. The control means maintains the linear power amplifier active devices unenergized between successive of the mutually spaced bursts of high-frequency signals.

In a particularly preferred embodiment, the invention provides a transmitter for use in electronic article surveillance, comprising: a transmitting antenna; a source of high-frequency signals; an amplifier having active devices for linear amplification of input signals; a power supply for the amplifier active devices; first switch means operable for connecting the source of high frequency signals to the linear power amplifier; second switch means operable for connecting the power supply to the amplifier active devices; and control means for operating the first and second switches.

The foregoing and other objects and features of the invention will be further understood from the following detailed description.

DESCRIPTION OF THE DRAWINGS

FIG. 2(*b*) and FIG. 2(*c*) are timing charts showing the times of closing and opening of switches SW1 and SW2 of the FIG. 1 EAS transmitter.

FIG. 4(*b*) and FIG. 4(*c*) are timing charts showing the times of closing and opening of switches SW1 and SW2 of the FIG. 3 EAS transmitter.

DETAILED DESCRIPTION OF PREFERRED EMBODIMENTS AND PRACTICES

Figure 1:
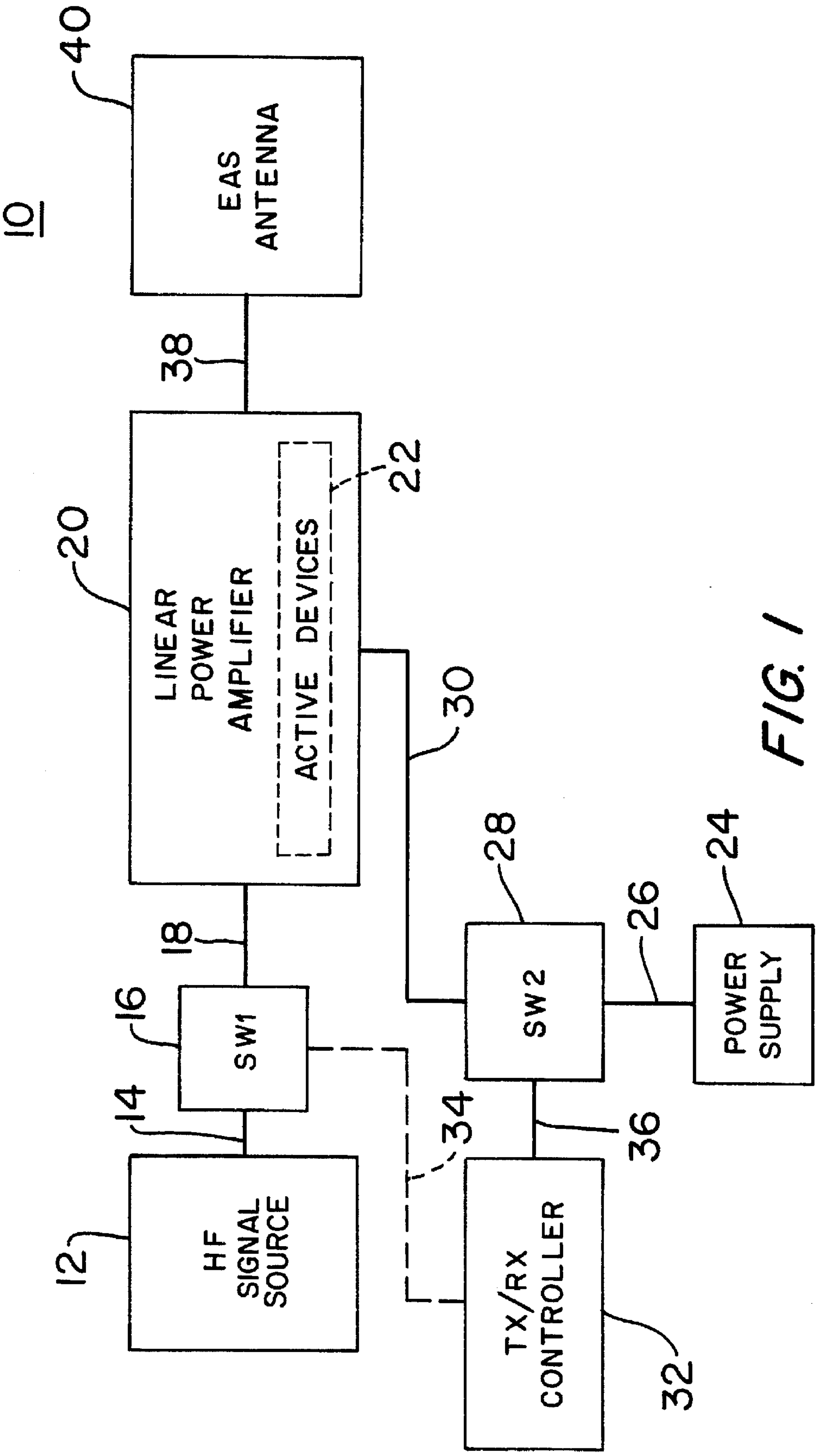
FIG. 1 is a block diagram of a first embodiment of an EAS transmitter in accordance with the invention.
Figure 3:
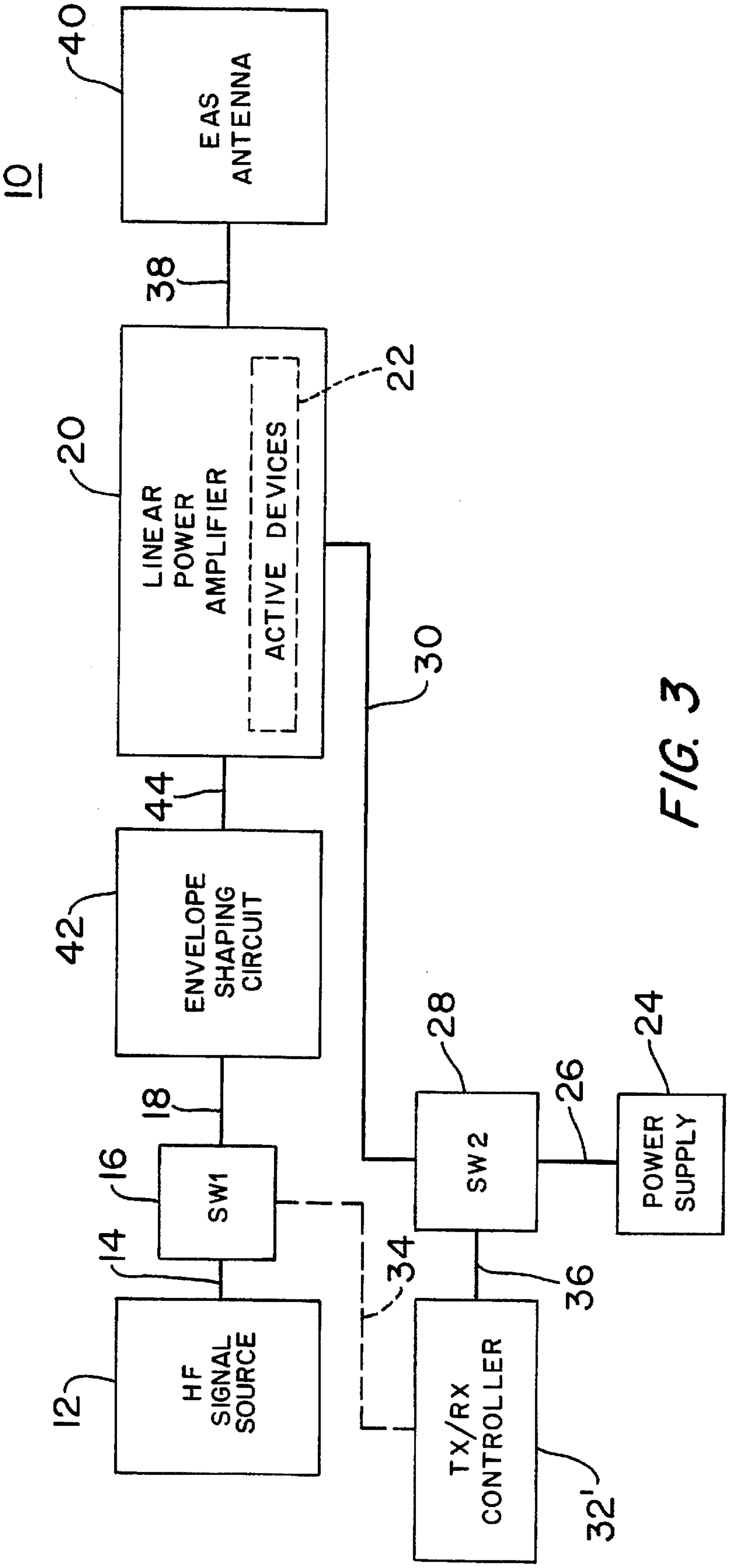
FIG. 3 is a block diagram of a second embodiment of an EAS transmitter in accordance with the invention.

Referring to FIG. 1, EAS transmitter 10 includes HF SIGNAL SOURCE 12, which may generate a continuous succession of high-frequency sinusoidal signals, such as are shown at the lefthand side of FIG. 3 of the '696 patent to which incorporating reference has been made. The signals are applied over line 14 to switch SW1 16, whose output signals are applied over line 18 to LINEAR POWER AMPLIFIER 20. Amplifier 20 includes ACTIVE DEVICES 22, for linear amplification of signals input to the amplifier.

Power supply 24 provides output direct current power on lines 26 which is applied to switch SW2 28. The switch 28 output is provided on line 30 which is connected to the ACTIVE DEVICES 22.

TX/RX CONTROLLER 32 has output lines 34 and 36, respectively for control of the states of switches 16 and 28.

Amplifier 20 furnishes its output over line 38 to EAS ANTENNA 40.

In the FIG. 1 embodiment, SW1 16 corresponds to switch 16 of the '696 patent and signal source 12 has correspondence with clock generator 13, filter 14 and buffer amplifier 15 of the '696 patent. Controller 32 may be implemented in part by envelope timing circuit 17 and the '696 circuitry driving the same. Control broken line 34 herein would correspond to the broken line leading from envelope timing circuit 17 to switch 16 of the '696 patent.

Figure 2A:
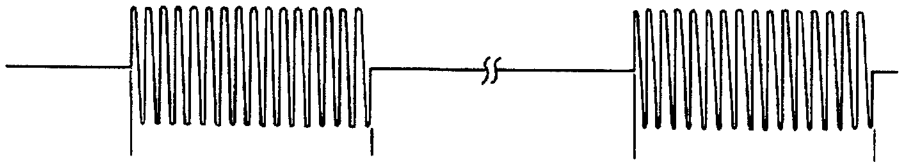
FIG. 2(*a*) depicts the input signal succession to the power amplifier of the FIG. 1 EAS transmitter.
Figure 2B:
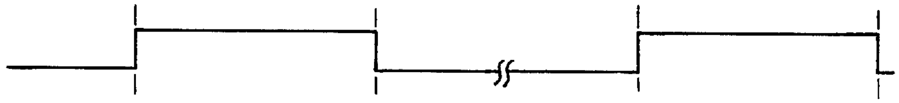
Figure 2C:
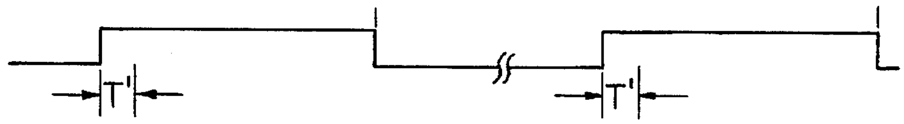

Referring to FIG. 2(*a*) of the subject application, the upper signal is the output of switch SW 1 16 of FIG. 1. It will be seen to correspond with the signal shown in FIG. 3 of the '696 patent, i.e., without the envelope shaping of the signal of FIG. 4 of the '696 patent.

FIG. 2(*b*) shows the open/close timing of switch SW1 16 of FIG. 1 herein. FIG. 2(*c*) shows the open/close timing of SW2 28, as effected by controller 32 in additional part controlling line 36. This controller additional part may be realized by gating a start close count from counter 18 of the '696 patent at a slightly earlier count than the start close count used for closing switch SW1 16, as is illustrated at T' in FIG. 2(*c*). Applicants herein have thus found that a quite short time period is in fact needed to provide energization (biasing) of the active devices 22 of amplifier 20 to place the amplifier in a linear amplification state, as contrasted with the prior art constant energization of the active devices.

Otherwise stated, the transmitter of FIG. 1 has control means which establishes predetermined spaced time periods for transmission from the antenna and operates the first and second switches during each predetermined spaced time period, i.e., closes them, and otherwise maintains the switches in open, non-conducting state. As noted, one switch is closed sufficiently prior to the other to place the active devices of the linear power amplifier in linear amplification state.

Turning now to FIG. 3, the second transmitter embodiment is identical to the first transmitter embodiment except for a different controller noted as 32' and the introduction of an envelope shaping circuit, corresponding to circuit 20 of the '696 patent, between switch SW1 16 and amplifier 20. Controller 32' may be implemented fully by envelope timing circuit 17 and the '696 circuitry driving the same.

Figure 4A:
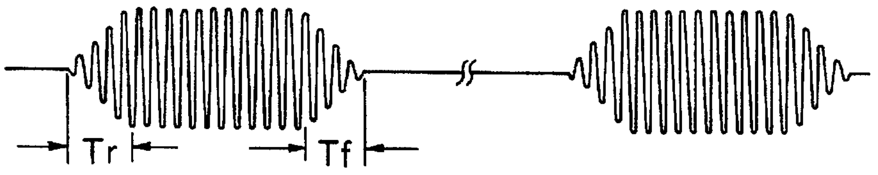
FIG. 4(*a*) depicts the input signal succession to the power amplifier of the FIG. 3 EAS transmitter.
Figure 4B:
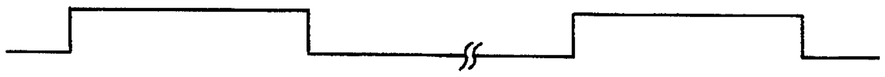
Figure 4C:
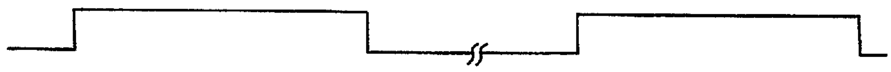

Referring to FIG. 4(*a*) of the subject application, the upper signal is the output of envelope shaping circuit 42 of FIG. 3. It will be seen to correspond with the signal shown in FIG. 4 of the '696 patent, i.e., with the envelope shaping of the '696 patent.

FIG. 4(*b*) shows the open/close timing of switch SW1 16 of FIG. 1 herein. FIG. 4(*c*) shows the open/close timing of SW2 28, as effected by controller 32' controlling line 36.

It is found that the embodiment of FIG. 3 provides quite clean emissions, without need for additional filtering. Thus, the adjusted rise time Tr is effective in this respect, whereby a signal is shaped to have a generally constant amplitude, with beginning and end portions of amplitudes respectively advancing to and receding from said generally constant amplitude. The embodiment of FIG. 1, on the other hand, with earlier powering of the active devices of the linear power amplifier can give rise to distortion and need for additional filtering to meet stringent cleean emission requirements.

Various changes in structure to the described systems and apparatus and modifications in the described practices may evidently be introduced without departing from the invention. Thus, whereas power supply 24 is shown as dedicated to switch SW2 28, the invention contemplates a common power supply for all system needs and simple switching of the common power supply as respects the active devices of the linear power amplifier. Accordingly, it is to be understood that the particularly disclosed and depicted embodiments are intended in an illustrative and not in a limiting sense. The true spirit and scope of the invention are set forth in the following claims.

What is claimed is:

1. A transmitter for use in electronic article surveillance, comprising:

a) a transmitting antenna;

b) a source of high-frequency signals;

c) an amplifier having active devices for linear amplification of input signals;

d) a power supply for said amplifier active devices;

e) first switch means operable for connecting said source of high frequency signals to said linear power amplifier;

f) second switch means operable for connecting said power supply to said amplifier active devices; and g) control means for operating said first and second switches.

2. The transmitter claimed in claim 1, wherein said control means establishes predetermined spaced time periods for transmission from said antenna and operates said first and second switches during each said predetermined spaced time period.

3. The transmitter claimed in claim 2, wherein said control means simultaneously closes said first and second switches.

4. The transmitter claimed in claim 2, wherein said source of high-frequency signals generates a continuous sinusoidal signal, said system further including envelope shaping means for shaping said sinusoidal signal issuing from said first switch means in said predetermined spaced time periods.

5. The transmitter claimed in claim 4, wherein said envelope shaping means provides said sinusoidal signal issuing from said first switch means in said predetermined spaced time periods with a generally constant amplitude and with beginning and end portions of amplitudes respectively advancing to and receding from said generally constant amplitude.

6. A transmitter for use in electronic article surveillance, comprising:

a) a transmitting antenna;

b) a source providing a succession of mutually spaced bursts of high-frequency signals;

c) a linear power amplifier having active devices for linear amplification of said succession of mutually spaced bursts of high-frequency signals; and d) control means for selectively energizing said linear power amplifier active devices during time periods which differ from time periods of said mutually spaced bursts of high-frequency signals.

7. In combination, in a pulsed transmitter for use in electronic article surveillance:

a) a linear power amplifier having active devices for linear amplification of signals input thereto; and b) control means for energizing said linear power amplifier active devices during time periods which differ from time periods of transmitter pulsations.

* * * * *